Patented Apr. 17, 1934

1,955,239

UNITED STATES PATENT OFFICE 1,955,239

MANUFACTURE OF VISCOSE

Adolf Kämpf and Heinrich Fink, Premnitz, Westhavelland, and Arno Matthes, Milow, Kreis Jerichow, Germany, assignors to I. G. Farbenindustrie Aktiengesellschaft, Frankfort-on-the-Main, Germany No Drawing. Application July 18, 1931, Serial No. 551,790. In Germany August 18, 1930

4 Claims. (Cl. 260—10)

Our present invention relates to the manufacture of viscose solutions and more particularly of viscose solutions of reduced viscosity.

One of its objects is a process for obtaining such solutions; further objects will be seen from the detailed specification following hereafter.

We have found that the viscosity of a viscose solution is quite surprisingly reduced when starting from an alkali cellulose made by immersing the cellulose in an aqueous caustic soda soaking solution containing a small quantity of an unpolymerized aliphatic compound having at least two hydroxyl groups. Such aliphatic compounds are, for instance, dihydric and polyhydric alcohols, such as glycol, glycerine which is preferably used on account of its low price, erythrite, mannite, etc., it being unnecessary that an unbranched carbon chain is present. Pentaerythrite has, for instance, an excellent action. There are furthermore suited derivatives of the dihydric and polyhydric alcohols, such as plyceric acid, gluconic acid, caccharic acid

[(CHOH)$_4$ (COOH)$_2$=C$_6$H$_{10}$O$_8$]

saccharinic acid of the formula

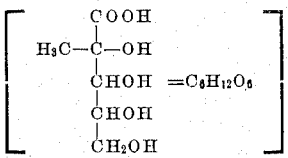

There may also be used substances which form in the aqueous caustic soda solution the active hydroxyl compounds only after standing for some time, for instance, the glycerides. Some of the sugars, such as glucose, do not show their activity directly after being dissolved in the aqueous caustic soda solution, but only after the aqueous caustic soda solution has been allowed to stand for some time.

The optimum addition for compounds containing not less than 3 hydroxyl groups lies between 1% and 2% of the weight of the aqueous caustic soda solution, and for bodies with 2 hydroxyl groups between 2% and 3%; but even an addition of much less than 1% has a very distinct and frequently sufficient action. Therefore, irregularities in the dose of the organic addition, if they do not considerably vary from the optimum quantity, do not cause disturbing fluctuations of the viscosity. A few simple comparative experiments should be made to determine the best kind of polyhydric alcohol and the most suitable amount to employ with a particular cellulose. As mentioned above, however, we preferably use glycerine as an assistant. There may even be carried out several successive immersion operations, while using in the first aqueous caustic soda solution containing, for instance, 1% of glycerine and adding fresh alkali, but no glycerine in successive operations, without noteworthy increase of the viscosity of the viscose solutions prepared from the alkali cellulose which is obtained in the later operations. Under this working conditions the polyhydric alcohol binds hardly a small part of the NaOH of the aqueous caustic soda solution used for immersion.

It is very remarkable that only within the range of small quantities of the added substance the viscosity is reduced. When adding a larger quantity, for instance, more than 2 per cent of glycerine the action of this assistant is appreciably smaller. Thus at most 5 per cent of the said additional compounds should be used. When equal quantities of different compounds are compared the reduction of the viscosity is generally increased if the added body contains more hydroxyl groups.

The process may be applied, as it is mostly usual, in cases where the alkali cellulose is pressed off after the immersion process and xanthated in the form of shredded alkali cellulose, as well as in cases where the alkali cellulose without being pressed off is subjected in the presence of an excess of the aqueous caustic soda solution to the action of carbon disulfide. Furthermore it can be utilized with the same success when using lignocellulose, made by any disintegrating method, and when using cotton, linters, etc. It may, of course, also be used in combination with a ripening of the alkali cellulose.

The following examples illustrate the invention:

1. 100 kilos of sulfite cellulose are immersed for 2½ hours at 10° C. into 2000 kilos of an aqueous solution of caustic soda of 18 per cent strength, pressed off to 300 kilos, disintegrated for 2 hours at 12° C.–14° C., then xanthated (sulfidized) for 3½ hours at 19° C.–27° C. with 33 kilos of carbon disulfide. The xanthogenate obtained is dissolved in so large a quantity of caustic lye that the cellulose content of the viscose amounts to 5% at a total quantity of alkali of 5.8%. The viscosity of this viscose amounts to 153 seconds. By adding, however, to the aqueous caustic soda solution for immersion the following additions, the following viscosities are obtained:

a: 1% of mannite_____ 21 seconds
b: 1% of pentaerythrite_____ 22 seconds
c: 1% of glycerine_____ 29 seconds
d: 3% of glycerine_____ 39 seconds
e: 1% of glycol_____ 48 seconds
f: 1% of crude gluconic acid_____ 48 seconds 2. 100 kilos of linters are worked up into viscose as indicated in Example 1c, while using an aqueous caustic soda solution for immersion containing 1% of glycerine. The viscosity amounts to 20 seconds, whilst it amounts to 58 seconds when using a pure aqueous caustic soda solution for immersion.

3. 100 kilos of so-called alpha-fibre-cellulose are worked up as indicated in Example 1c with an aqueous caustic soda solution containing 1% of glycerine. The viscosity amounts to 73 seconds, whereas it amounts to 382 seconds when using a pure immersion lye.

4. 100 kilos of so-called alpha-fibre-cellulose are worked up into viscose as indicated in Example 3, while using an aqueous soda solution for immersion containing only 0.5% of glycerine. The viscosity of the viscose amounts to 170 seconds.

All of the viscosities are represented by the time a steel ball of 3 mm. diameter requires for passing through a column of 20 cm. height of the viscose solution at a temperature of 20° C.

What we claim is:

1. In the manufacture of viscose solutions the step, which comprises alkalizing the cellulose in an aqueous caustic soda solution containing a small quantity of an unpolymerized aliphatic compound with at least 2 hydroxyl groups.

2. In the manufacture of viscose solutions the step, which comprises alkalizing the cellulose in an aqueous caustic soda solution containing at most 5 per cent of an unpolymerized aliphatic compound with at least two hydroxyl groups.

3. In the manufacture of viscose solution the step, which comprises alkalizing the cellulose in an aqueous caustic soda solution containing a small quantity of a polyhydric alcohol.

4. In the manufacture of viscose solutions the step, which comprises alkalizing the cellulose in an aqueous caustic soda solution containing 1 to 3 per cent of glycerine.

ADOLF KÄMPF.
HEINRICH FINK.
ARNO MATTHES.